United States Patent
Hupman et al.

(10) Patent No.: US 7,366,924 B2
(45) Date of Patent: Apr. 29, 2008

(54) SYSTEMS AND METHODS FOR DISABLING POWER MANAGEMENT IN A COMPUTER SYSTEM

(75) Inventors: Paul M. Hupman, Magnolia, TX (US); Michael D. Batchelor, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 416 days.

(21) Appl. No.: 11/113,482

(22) Filed: Apr. 25, 2005

(65) Prior Publication Data

US 2006/0242439 A1  Oct. 26, 2006

(51) Int. Cl.
*G06F 1/00* (2006.01)
*G06F 11/30* (2006.01)
*G05B 11/01* (2006.01)

(52) U.S. Cl. ............ 713/300; 713/340; 700/22

(58) Field of Classification Search ........... 713/300, 713/340; 320/117, 127, 162; 700/22
See application file for complete search history.

(56) References Cited

U.S. PATENT DOCUMENTS

| | | | |
|---|---|---|---|
| 5,758,172 A * | 5/1998 | Seo | 713/300 |
| 6,498,957 B1 | 12/2002 | Umetsu | |
| 6,618,042 B1 | 9/2003 | Powell | |
| 6,828,760 B2 * | 12/2004 | Massey et al. | 320/127 |
| 6,928,568 B2 * | 8/2005 | Breen et al. | 713/340 |
| 7,240,226 B2 * | 7/2007 | Matsuoka | 713/300 |
| 2003/0159073 A1 | 8/2003 | Breen et al. | |
| 2004/0008462 A1 | 1/2004 | Kluth et al. | |
| 2006/0103996 A1 * | 5/2006 | Carroll et al. | 361/90 |

FOREIGN PATENT DOCUMENTS

EP  0 551 080  7/1993

* cited by examiner

*Primary Examiner*—Suresh K Suryawanshi

(57) ABSTRACT

A power adapter comprises a power supply to output power for powering a powered device when the powered device is coupled to the power adapter. The power adapter further comprises a disable throttle indicator that, when the powered device is coupled to the power adapter, indicates to the powered device that the powered device need not reduce an amount of power used by the powered device in order to keep the power adapter within regulation.

23 Claims, 2 Drawing Sheets

SYSTEMS AND METHODS FOR DISABLING POWER MANAGEMENT IN A COMPUTER SYSTEM

BACKGROUND

One way in which power is supplied to a portable computer is by using a power adapter. The power adapter is coupled to an alternating current (AC) power source (such as an AC outlet) and converts an AC line voltage to a lower, direct current (DC) voltage suitable for use by the portable computer. The power adapter is typically a unit that is separate from the portable computer. A portable computer is designed to be moved. When a portable computer is moved to a new location, a power adapter is often brought to the new location along with the portable computer. As a result, it is desirable to reduce the size and weight of the power adapter in order to facilitate the movement of the power adapter.

Typically, a portable-computer power adapter is designed to output a particular nominal output voltage for load currents up to a particular maximum current level. When the load current reaches or exceeds the maximum current level, the power adapter reduces the output voltage in order to attempt to prevent the load current from exceeding the maximum current level. Reducing the output voltage in this manner is referred to as "current limiting" the power adapter. Reducing the output voltage of the power adapter is typically undesirable (for example, such a reduction may result in the portable computer shutting down).

In one approach to avoiding having a power adapter enter such a current limiting state, a portable computer determines how much current the portable computer is drawing from the power adapter. The portable computer, in such an implementation, is designed and configured assuming that any power adapter used to power the portable computer will have a predetermined, fixed maximum current level (also referred to here as the "assumed maximum current level"). When the amount of current drawn by the portable computer exceeds the assumed maximum current level, the portable computer reduces the amount of power used by the portable computer. For example, in one implementation, the portable computer reduces the amount of power that is used for battery charging and/or reduces the clock frequency at which a central processing unit of the portable computer operates. This approach typically degrades the portable computer's performance (for example, by increasing the amount of time required to charge a battery and/or by reducing the speed at which a processor executes program instructions). However, if the portable computer is used with a power adapter that has a maximum current level that is greater than the assumed maximum current level used by the portable computer, the performance of the portable computer can be degraded unnecessarily (that is, in situations, where the current drawn by the portable computer is greater than the assumed maximum current level but less than the actual maximum current level of the power adapter).

DRAWINGS

Like reference numbers and designations in the various drawings indicate like elements.

DETAILED DESCRIPTION

Figure 1:
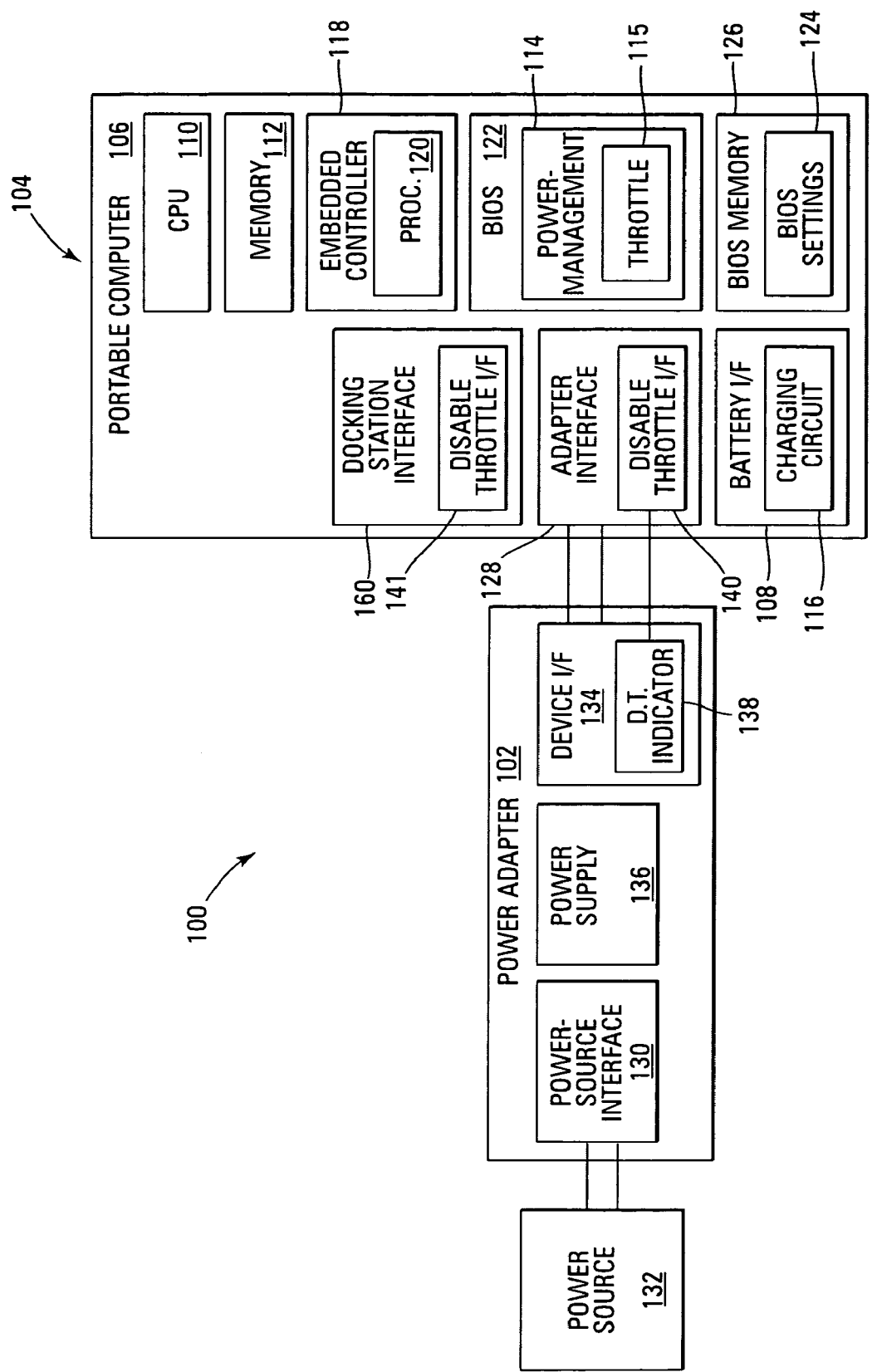
FIG. 1 is a block diagram of one exemplary embodiment of a computing system in accordance with the invention.

FIG. 1 is a block diagram of one exemplary embodiment of a computing system 100 in accordance with the invention. The computing system 100 comprises a power adapter 102 that is used to power at least one powered device 104. In the particular embodiment shown in FIG. 1, the powered device 104 comprises a portable computer 106. The portable computer 106, in the embodiment shown in FIG. 1, can be powered by the power adapter 102 (when coupled thereto) or by a battery coupled to the portable computer 106 via a battery interface 108. In other embodiments, one or more other external devices that are communicatively coupled to the portable computer 106 (for example, a docking station or an external drive unit such as an optical or floppy drive unit) are also powered by the power adapter 102. In some other embodiments, a power adapter is used to power other types of electronic devices such as other types of battery-powered devices.

The portable computer 106 comprises at least one central processing unit (CPU) 110 and memory 12. The CPU 110 executes various items of software, including, for example, an operating system and one or more applications. Typically, a portion of the software executed by the CPU 110 and one or more data structures used by the software during execution are stored in the memory 112. Memory 112 comprises any suitable memory now known or later developed such as, for example, random access memory (RAM), read only memory (ROM), and/or registers within the CPU 110.

The portable computer 106 comprises an adapter interface 128 for coupling the portable computer 106 to a power adapter (such as the power adapter 102). In the embodiment shown in FIG. 1, the adapter interface 128 comprises a pair of power terminals over which power is received from a respective pair of power terminals included in the power adapter to which the portable computer 106 is coupled. In the embodiment shown in FIG. 1, the portable computer 106 further comprises a docking station interface 160 for coupling the portable computer 106 to a docking station. In one implementation of such an embodiment, the docking station interface 160 comprises a pair of power terminals over which power is received from the docking station when the portable computer 106 is coupled to the docking station. In such an implementation, the docking station interface 160 comprises other terminals (not shown in FIG. 1) via which signals are communicated between the portable computer 106 and the docking station.

In the embodiment shown in FIG. 1, the portable computer 106 includes power-management functionality 114. The power-management functionality 114 controls the amount of power that is used by the computer 106. The power-management functionality 114 includes functionality 115 (also referred to here as "throttle functionality" 115) that attempts to keep the power adapter 102 from which the portable computer 106 receives power within regulation. As used herein, "within regulation" refers to a state in which a power adapter is able to output a nominal output voltage for which the power adapter is designed (or that is otherwise associated with the power adapter) while supplying a load current that is below a maximum current level for which the power adapter is designed (or that is otherwise associated with the power adapter). For example, a power adapter is not within regulation when the power adapter is in a "current limited" state in which the power supply is outputting less than a nominal output voltage for the power adapter in order to keep the load current supplied by the power adapter below a maximum load current for the power adapter. In other words, by keeping a power adapter within regulation, the power adapter is kept from entering a current limited state.

The throttle functionality 115, in the embodiment shown in FIG. 1, assumes that any power adapter used to power the portable computer 106 has a predetermined, fixed maximum load current (also referred to here as the "assumed maximum load current"). The throttle functionality 115, in such an embodiment, determines how much current is being drawn by the portable computer 106 from the power adapter 102 (also referred to here as the "measured current"). The throttle functionality 115 controls the amount of power used by the portable computer 106 based on the measured current and the assumed maximum load current for the power adapter 102. The throttle functionality 115, in such an embodiment, is able to control the amount of power used by the portable computer 106 so that the measured current (that is, the amount of current drawn by the portable computer 106 from the power adapter 102) is below the assumed maximum load current. In other embodiments, the power-management functionality 114 is implemented in other ways.

In the embodiment shown in FIG. 1, the throttle functionality 115 reduces the amount of power used by the portable computer 106 by reducing the amount of power used to charge one or more batteries inserted into (or otherwise coupled to) the portable computer 106 via the battery interface 108. The battery interface 108 comprises a charging circuit 116 for charging any batteries that are coupled to the portable computer 106 that need charging. The charging circuit 116, in such an embodiment, is able to adjust the amount of power used for battery charging under the control of the throttle functionality 115. Also, in the embodiment shown in FIG. 1, the throttle functionality 115 reduces the amount of power used by the portable computer 106 by reducing the clock frequency at which CPU 110 operates.

In the embodiment shown in FIG. 1, the portable computer 106 comprises an embedded controller 118 that controls the operation of one or more of the other components in the portable computer 106. In such an embodiment, the power-management functionality 114 is implemented, at least in part, using the embedded controller 118. In such an implementation, the embedded controller 118 interacts with configuration and/or power management interfaces provided by various components in the portable computer 106 (for example, the battery interface 108 and the CPU 110).

In the embodiment shown in FIG. 1, the embedded controller 118 is implemented using a programmable processor 120 that executes appropriate software to carry out the processing described here as being performed by the embedded controller 118. Such software comprises program instructions that are stored (or otherwise embodied) on an appropriate storage medium or media (such as flash memory) from which at least a portion of the program instructions are read by the programmable processor 120 for execution thereby. In the embodiment shown in FIG. 1, the software executed by the programmable processor 120 of the embedded controller 118 comprises a basic input/output system (BIOS) 122 that provides an interface between the hardware of the portable computer 106 and the operating system and other software executed by the CPU 110. Various system configuration settings 124 (also referred to here as a "BIOS settings" 124) that are used by the BIOS 122 are stored in memory 126 (also referred to here as "BIOS memory" 126). In the particular embodiment shown in FIG. 1, the BIOS memory 126 comprises non-volatile memory (for example, complimentary metal oxide (CMOS) memory). In other embodiments, the memory 126 in which the BIOS settings 124 are stored is located elsewhere in the portable computer 106 and/or is implemented using other types of memory now known or later developed (for example, others types of non-volatile memory).

The power adapter 102 comprises a power-source interface 130 that is used to couple the power adapter 102 to an AC power source 132 (such as an AC outlet). The power adapter 102 also comprises a device interface 134 that is used to couple the power adapter 102 to the powered device 104 (the portable computer 106 in the embodiment shown in FIG. 1). In the embodiment shown in FIG. 1, both the power-source interface 130 and the device interface 134 comprise a respective pair of power terminals. In one implementation of the embodiment shown in FIG. 1, the power adapter 102 is directly coupled to the power source 132 and to the portable computer 106 using appropriate cabling and connectors. In another embodiment, the power adapter 102 is coupled to the portable computer 106 indirectly via one or more intermediary devices such as a docking station.

The power adapter 102 also comprises a power supply 136 that converts an AC line voltage from the AC power source 132 to a lower DC voltage suitable for use by the portable computer 106. The power adapter 102 and the power supply 136 are designed to supply sufficient power to power any load that would likely be encountered by the computing system 100. That is, the power adapter 102 is designed to output sufficient power to power the portable computer 106, recharge one or more batteries inserted in the portable computer 106, and power any external devices that are likely to be coupled to the portable computer 106 (for example, a docking station or other devices such as an optical or disk drive). Such a power adapter 102 is also referred to here as an "unconstrained" power adapter 102. When an unconstrained power adapter 102 is used to power the portable computer 106, the portable computer 106 need not reduce the amount of power used by the portable computer 106 in order to keep the power adapter 102 within regulation (though, in some embodiments, the portable computer 106 includes functionality that reduces or otherwise adjusts the amount of power used by the portable computer 106 for other reasons).

The power adapter 102 communicates or otherwise indicates to the portable computer 106 that the power adapter 102 is unconstrained and that the portable computer 106 need not reduce the amount of power used by the portable computer 106 in order to keep the power adapter 102 within regulation. In the embodiment shown in FIG. 1, the power adapter 102 comprises a disable throttle indicator 138 that indicates to the portable computer 106, when the portable computer 106 is coupled to the power adapter 102 (either directly or via one or more intermediary devices such as a docking station), that the portable computer 106 need not reduce the amount of power used by the portable computer 106 in order to keep the power adapter 102 within regulation. The portable computer 106 comprises at least one disable throttle interface that receives the indication from the power adapter 102 (or otherwise determines that the power adapter 102 is indicating that the portable computer 106 need not reduce the amount of power used by the portable computer 106 in order to keep the power adapter 102 within regulation). In other words, the disable throttle indicator 138 indicates to the portable computer 106 that the power adapter 102 is an unconstrained power adapter 102.

In the particular embodiment shown in FIG. 1, the adapter interface 128 of the portable computer 106 comprises a disable throttle interface 140 and the docking station interface 160 of the portable computer 106 comprises a disable throttle interface 141. In such an embodiment, the disable throttle interface 140 included in the adapter interface 128 interacts with any disable throttle indicator 138 of a power adapter when that power adapter is coupled to the portable computer 106 via the adapter interface 128. The disable throttle interface 141 included in the docking station interface 160 interacts with any disable throttle indicator of a docking station when that docking station is coupled to the portable computer 106 via the docking station interface 160. If either of the disable throttle interfaces 140 or 141 receives from a power adapter an indication that the portable computer 106 need not reduce the amount of power used by the portable computer 106 in order to keep that power adapter within regulation, the throttle functionality 115 included in the power-management functionality 114 is disabled. If neither of the disable throttle interfaces 140 or 141 receive such an indication, the throttle functionality 115 included in the power-management functionality 114 is enabled (if such functionality 115 has not been otherwise disabled, for example, via a manual change to a BIOS setting 124 maintained by the BIOS 122).

In some implementations of such an embodiment, the disable throttle interface 140 of the portable computer 106 comprises a switch that is mechanically actuated by the disable throttle indicator 138 of the power adapter 102 when the power adapter 102 is coupled to the portable computer 106 via the adapter interface 128. In one such implementation, the disable throttle interface 140 of the portable computer 106 comprises a normally closed switch that is mechanically actuated. In such an implementation, the disable throttle indicator 138 of the power adapter 102 comprises a pin (or other physical member) that mechanically actuates the switch when the portable computer 102 is coupled to the portable computer 106 via the adapter interface 128 (which opens the switch) and again when the adapter 102 is decoupled from the portable computer 106 (which closes the switch). In such an implementation, the throttle functionality 115 included in the power-management functionality 114 is disabled while the switch is open. In another implementation, the disable throttle interface 140 of the portable computer 106 comprises a normally open switch that is mechanically actuated. In such an implementation, the disable throttle indicator 138 of the power adapter 102 comprises a pin (or other physical member) that mechanically actuates the switch when the portable computer 102 is coupled to the portable computer 106 via the adapter interface 128 (which closes the switch) and again when the power adapter 102 is decoupled from the portable computer 106 (which open the switch). In such an implementation, the throttle functionality 115 included in the power-management functionality 114 is disabled while the switch is closed.

In other implementations, the disable throttle interface 140 of the portable computer 106 comprises a normally open switch or relay that is electrically actuated by the disable throttle indicator of the power adapter 102. In one such implementation, the disable throttle interface 140 of the portable computer 106 comprises two terminals of a circuit that are electrically isolated from one another when an unconstrained power supply 102 is not coupled to the adapter interface 128 of the portable computer 106. In such an implementation, the disable throttle indicator 138 of the power adapter 102 comprises a conductive member that electrically couples the two terminals of the disable throttle interface 140 (for example, by physically contacting each of the two terminals) when the power adapter 102 is coupled to the portable computer 106 via the adapter interface 128. In such an implementation, the throttle functionality 115 included in the power-management functionality 114 is disabled while the two terminals of the disable throttle interface 140 are electrically coupled to one another (for example, by the conductive member of the disable throttle indicator 138 of the power adapter 102).

In another implementation of such an embodiment, the disable throttle interface 140 comprises a terminal (or other interface) by which a disable signal output by the power adapter 102 is received by the portable computer 106. In such an implementation, the disable throttle indicator 138 of the power adapter 102 comprises a source of the disable signal and a terminal (or other interface) from which the disable signal is output. When the power adapter 102 is coupled to the portable computer 106, the disable signal output on the terminal included in the disable throttle indicator 138 of the power adapter 102 is received on the terminal included in the disable throttle interface 140 of the portable computer 106. In such an implementation, the throttle functionality 115 included in the power-management functionality 114 is disabled while the portable computer 106 receives the disable signal.

Exemplary implementations and embodiments of the disable throttle interface 141 included in the docking station interface 160 are implemented in the manner described above with respect to the disable throttle interface 140 of the adapter interface 128.

FIG. 1 illustrates how an indication that the portable computer 106 need not reduce the amount of power used by the portable computer 106 in order to keep the power adapter 102 within regulation is communicated directly from the power adapter 102 to the portable computer 106. In other usage scenarios, such an indication is communicated from the power adapter 102 to the portable computer 106 via one or more intermediary devices such as a docking station. One example of such a usage scenario is illustrated in FIG. 2.

Figure 2:
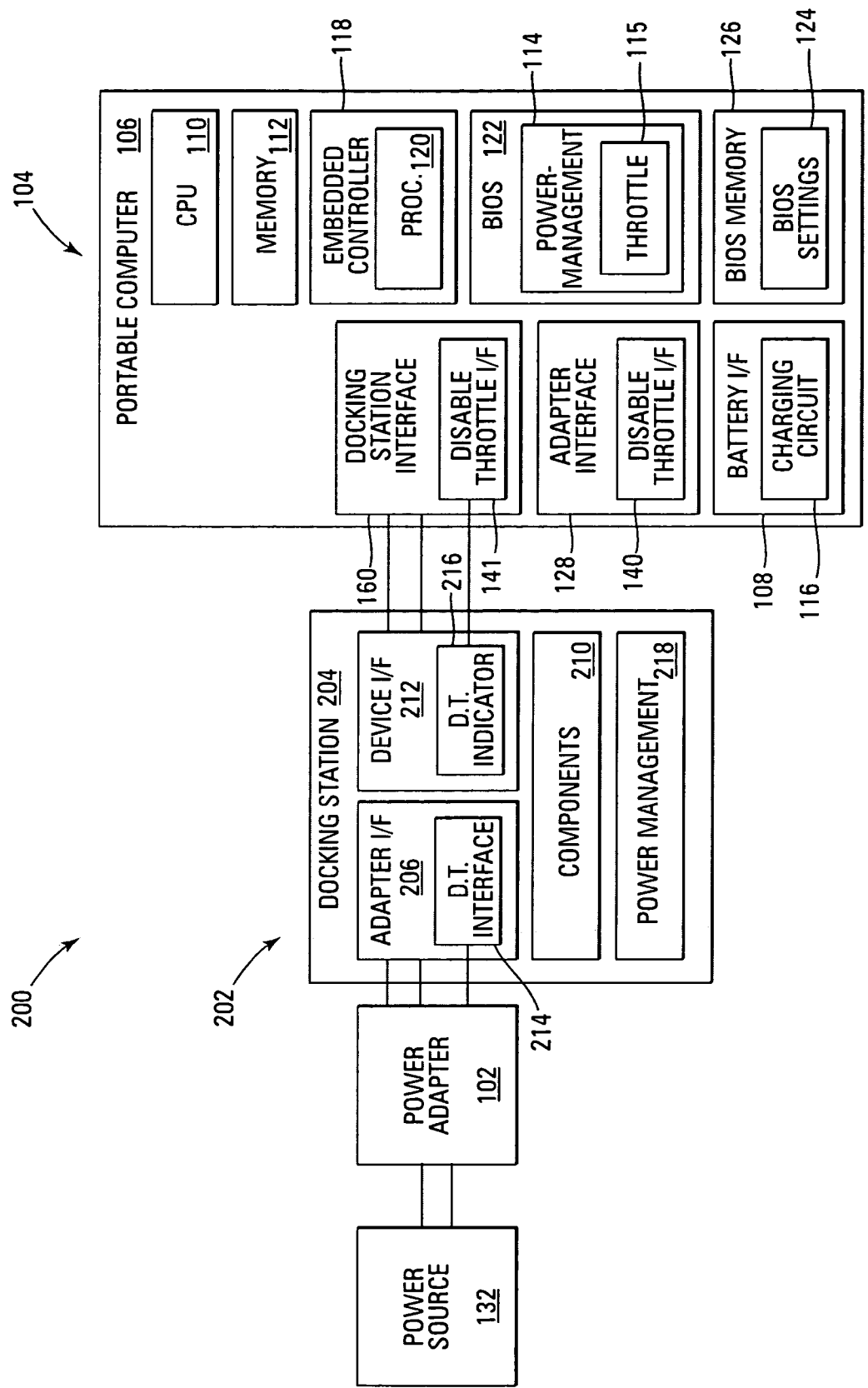
FIG. 2 is a block diagram of one exemplary embodiment of a computing system in accordance with the invention.

FIG. 2 is a block diagram of one exemplary embodiment of a computing system 200 in accordance with the invention. In the embodiment shown in FIG. 2, the power adapter 102 of FIG. 1 is coupled to the portable computer 106 of FIG. 1 via an intermediary device 202, which in this embodiment comprises a docking station 204. In such an embodiment, the power adapter 102 supplies power to the docking station 204 (to power any components included in the docking station 204 such as one or more light-emitting diodes), the portable computer 106, and any other devices coupled to the portable computer 106 or the docking station 204 (for example, an optical drive and/or floppy drive).

The docking station 204, in the embodiment shown in FIG. 2, includes an adapter interface 206 that is used to couple the docking station 204 to the power adapter 102. The adapter interface 206 of the docking station 202 comprises a pair of power terminals that are used to receive power from the power adapter 102 via the power terminals of the power adapter's device interface 134 (not shown in FIG. 2). In the embodiment shown in FIG. 2, power received from the power adapter 102 is used to power one or more components 210 (for example, one or more LEDs) of the docking station 204.

The docking station 204 also comprises a device interface 212 for coupling the docking station 204 to the docking station interface 160 of the portable computer 106. In embodiment shown in FIG. 2, the device interface 212 of the docking station 204 comprises a pair of power terminals. When the portable computer 106 is coupled to the docking station 204, power received from the power adapter 102 is supplied via the power terminals of the device interface 212 to the power terminals included in the docking station interface 160 of the portable computer 106.

In the particular embodiment shown in FIG. 2, the disable throttle interface 141 of the docking station interface 160 of the portable computer 106 comprises a terminal (also referred to here as a disable signal terminal) for receiving a disable signal output by the power adapter 102 and the disable throttle indicator 138 (not shown in FIG. 2) of the power adapter 102 comprises a source of the disable signal and a disable signal terminal from which the disable signal is output. In such an embodiment, the docking station 204 receives the disable signal output by the power adapter 102 and passes the disable through to the portable computer 106. The adapter interface 206 of the docking station 204, in such an embodiment, comprises a disable throttle interface 214 for receiving a disable throttle indicator (the disable signal in the embodiment shown in FIG. 2) from the power adapter 102 when the power adapter 102 is coupled to the docking station 204. In one implementation of such an embodiment, the disable throttle interface 214 comprises a disable throttle terminal for receiving the disable signal from the disable signal terminal included in the device interface 134 of the power adapter 102 when the power adapter 102 is coupled to the docking station 204. In such an embodiment, the device interface 212 of the docking station 204 comprises a disable throttle indicator 216 for indicating to the portable computer 106 that the portable computer 106 need not reduce the amount of power used by the portable computer 106 in order to keep the power adapter 102 within regulation. In one implementation, the disable throttle indicator 216 comprises a disable throttle terminal on which any disable signal received on the disable throttle interface 214 of the adapter interface 206 is output. When the portable computer 106 is coupled to the docking station 204, the disable signal terminal of the device interface 212 is communicatively coupled to the disable signal terminal of the docking station interface 160 of the portable computer 106. When the portable computer 106 receives the disable signal, the portable computer disables the throttle functionality 115.

In this way, the power adapter 102 indicates to the portable computer 106, via an intermediary device 202 (the docking station 204), that the portable computer 106 need not reduce the amount of power used by the portable computer 106 in order to keep the power adapter 102 within regulation.

In other embodiments, the docking station 204 indicates to the portable computer 106 that the portable computer 106 need not reduce the amount of power used by the portable computer 106 in order to keep the power adapter 102 within regulation in other ways. For example, in one such alternative embodiment, the docking station designed to be powered only by an unconstrained power adapter.

Also, in the embodiment shown in FIG. 2, the docking station 204 further comprises power-management functionality 218 that controls the amount of power used by the components 210 of the docking station 204 and/or generates information (for example, a load current measurement) for use by the portable computer 106 in controlling how much power the portable computer 106 uses. In one implementation of such an embodiment, at least a portion of the power-management functionality 218 is disabled if and while a disable signal (or other disable throttle indicator) is received from the power adapter 102.

What is claimed is:

1. A power adapter comprising:
   a power supply to output power for powering a powered device when the powered device is coupled to the power adapter; and
   a disable throttle indicator to provide an indication to the powered device to disable a power throttle operative within the powered device when the powered device is coupled to the power adapter;
   wherein the power throttle operative within the powered device controls an amount of power used by the powered device so that a load current drawn by the powered device remains below an assumed maximum load current for any power adapter coupled to the powered device.

2. The power adapter of claim 1, wherein the disable throttle indicator provides the indication to the powered device to disable the power throttle operative within the powered device by actuating a switch included in the powered device when the power adapter is coupled to the powered device.

3. The power adapter of claim 2, wherein the disable throttle indicator mechanically actuates the switch included in the powered device when the power adapter is coupled to the powered device.

4. The power adapter of claim 2, wherein actuating the switch included in the powered device when the power adapter is coupled to the powered device does at least one of: closing the switch and opening the switch.

5. The power adapter of claim 1, wherein the disable throttle indicator comprises a terminal on which a disable throttle indicator signal is communicated to the powered device.

6. A power adapter comprising:
   a power supply to output power for powering a powered device when the powered device is coupled to the power supply;
   wherein, when the powered device is coupled to the power adapter, the power supply communicates, to the powered device, information indicating to the powered device that the powered device should disable a power throttle operative within the powered device;
   wherein the power throttle operative within the powered device controls an amount of power used by the powered device so that a load current drawn by the powered device remains below an assumed maximum load current for any power adapter coupled to the powered device.

7. The power adapter of claim 6, further comprising a device interface via which the power is applied to the powered device.

8. The power adapter of claim 7, wherein the information is communicated to the powered device when the powered device is coupled to the power adapter via the device interface.

9. The power adapter of claim 6, wherein the powered device comprises a portable computer.

10. The power adapter of claim 6, wherein the power adapter is coupled to the powered device via an intermediary device.

11. A powered device comprising:
   an interface to receive power from a power adapter;
   wherein the powered device comprises a power management function that, when performed, controls an amount of power used by the powered device so that a load current drawn by the powered device is below an assumed maximum load current for any power adapter coupled to the powered device;

wherein the powered device further comprises a disable throttle interface to receive an indication from the power adapter that the power management function need not be performed.

12. The powered device of claim 11, wherein, in response to receiving the indication, the powered device does not perform the power management function.

13. The powered device of claim 11, wherein the interface comprises a switch, wherein the indication is received when the switch is actuated.

14. The powered device of claim 13, wherein the indication is received when the switch is mechanically actuated.

15. The powered device of claim 13, wherein the indication is received when at least one of the following occurs: the switch is closed and the switch is opened.

16. The powered device of claim 11, wherein the interface comprises a terminal on which a disable throttle indicator signal is received.

17. The powered device of claim 11, wherein the power management function comprises at least one of: reducing the amount of power used to charge a battery and reducing a frequency at which a processing unit is operated.

18. The powered device of claim 11, further comprising a basic input/output system, wherein the basic input/output system is operable to cause the powered device to perform the power management function.

19. A powered device comprising:
means for receiving power from a power adapter;
means for using at least a portion of the received power to power at least one component;
means for throttling the amount of power used by the powered device so that a load current drawn by the powered device remains below an assumed maximum load current for any power adapter coupled to the powered device; and
means for receiving an indication that the powered device should disable the means for throttling the amount of power used by the powered device.

20. The powered device of claim 19, wherein the component comprises a processing unit, wherein the powered device further comprises means for adjusting a frequency at which the processing unit operates in order to control the amount of power used by the processing unit.

21. The powered device of claim 19, wherein the component comprises a battery charger, wherein the powered device further comprises means for adjusting an amount of power used by the battery charger in order to control the amount of power used by the battery charger.

22. A method comprising:
providing power from a power adapter to a powered device; and
indicating to the powered device that the powered device should disable a power throttle operative within the powered device;
wherein the power throttle operative within the powered device controls an amount of power used by the powered device so that a load current drawn by the powered device remains below an assumed maximum load current for any power adapter coupled to the powered device.

23. The method of claim 22, wherein indicating to the powered device that the powered device need not reduce the amount of power used by the powered device in order to keep the power adapter from entering the current limited state comprises at least one of:
directly indicating to the powered device that the powered device should disable a power throttle operative within the powered device; and
indirectly indicating to the powered device that the powered device should disable a power throttle operative within the powered device.

* * * * *

UNITED STATES PATENT AND TRADEMARK OFFICE
CERTIFICATE OF CORRECTION

PATENT NO. : 7,366,924 B2 Page 1 of 1
APPLICATION NO. : 11/113482
DATED : April 29, 2008
INVENTOR(S) : Paul M. Hupman et al.

It is certified that error appears in the above-identified patent and that said Letters Patent is hereby corrected as shown below:

In column 2, line 21, delete "memory 12" and insert -- memory 112 --, therefor.

Signed and Sealed this

Second Day of September, 2008

JON W. DUDAS
*Director of the United States Patent and Trademark Office*